US009766337B2

(12) United States Patent
Spinelli

(10) Patent No.: US 9,766,337 B2
(45) Date of Patent: Sep. 19, 2017

(54) ALTERNATIVE COMMUNICATIONS FOR AN AIR VEHICLE

(75) Inventor: Charles B. Spinelli, Bainbridge Island, WA (US)

(73) Assignee: The Boeing Company, Chicago, IL (US)

(*) Notice: Subject to any disclaimer, the term of this patent is extended or adjusted under 35 U.S.C. 154(b) by 484 days.

(21) Appl. No.: 13/037,297

(22) Filed: Feb. 28, 2011

(65) Prior Publication Data

US 2012/0221175 A1   Aug. 30, 2012

(51) Int. Cl.
*G01S 19/00* (2010.01)
*G01S 19/01* (2010.01)
*G01S 19/13* (2010.01)
*H04B 7/185* (2006.01)

(52) U.S. Cl.
CPC .............. *G01S 19/01* (2013.01); *G01S 19/13* (2013.01); *H04B 7/18506* (2013.01); *H04B 7/18508* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,153,598 A * | 10/1992 | Alves, Jr. | ........... | G01S 19/25 342/352 |
| 5,721,783 A * | 2/1998 | Anderson | ........... | H04B 1/385 381/312 |
| 5,757,916 A * | 5/1998 | MacDoran | ........... | G01S 19/215 342/357.48 |
| 5,793,813 A * | 8/1998 | Cleave | ........... | H04B 7/18567 342/352 |
| 6,498,968 B1 * | 12/2002 | Bush | ........... | G05B 13/048 701/1 |
| 6,641,087 B1 * | 11/2003 | Nelson | ........... | B64D 45/0015 244/118.5 |
| 6,842,672 B1 * | 1/2005 | Straub | ........... | G05D 1/0077 244/1 R |
| 6,963,292 B1 * | 11/2005 | White | ........... | B64D 45/0015 340/426.12 |

(Continued)

FOREIGN PATENT DOCUMENTS

| CN | 101868923 | 10/2010 |
|---|---|---|
| CN | 101960502 | 1/2011 |

(Continued)

OTHER PUBLICATIONS

Matthew DeGarmo and Gregory M. Nelson, "Prospective Unmanned Aerial Vehicle Operations in the Future National Airspace System," http://www.mitre.org/work/tech_papers/tech_papers_04/04_0936/04_0936.pdf, 2004.

(Continued)

*Primary Examiner* — Jonathan L Sample
(74) *Attorney, Agent, or Firm* — Hanley, Flight & Zimmerman, LLC

(57) ABSTRACT

An air vehicle comprises a satellite receiver having messaging capability. The receiver is configured to process a command and control (C2) message when alternative communications are required. The air vehicle further comprises avionics for taking a course of action according to instructions in a C2 message received by the satellite receiver.

20 Claims, 4 Drawing Sheets

(56) References Cited

U.S. PATENT DOCUMENTS

| | | | | |
|---|---|---|---|---|
| 6,985,801 B1* | 1/2006 | Straub | G01C 23/00 | 244/1 R |
| 7,064,681 B2* | 6/2006 | Horstemeyer | B60R 25/102 | 340/573.4 |
| 7,184,744 B1* | 2/2007 | Schnabel | G01S 19/02 | 340/539.13 |
| 7,225,981 B2* | 6/2007 | Jongebloed | G06Q 10/087 | 235/385 |
| 7,747,364 B2* | 6/2010 | Roy | G05D 1/0044 | 244/158.1 |
| 2002/0107694 A1* | 8/2002 | Lerg | B60C 23/06 | 704/273 |
| 2002/0133294 A1* | 9/2002 | Farmakis | B60R 25/102 | 701/301 |
| 2003/0093187 A1* | 5/2003 | Walker | B64C 13/20 | 701/1 |
| 2003/0200026 A1* | 10/2003 | Pearson | G06F 8/65 | 701/301 |
| 2005/0031016 A1* | 2/2005 | Rosen | H04B 1/713 | 375/130 |
| 2007/0050100 A1* | 3/2007 | Gustafson | B64D 45/0015 | 701/3 |
| 2007/0129855 A1* | 6/2007 | Coulmeau | G08G 5/0039 | 701/3 |
| 2008/0033604 A1* | 2/2008 | Margolin | G05D 1/0044 | 701/2 |
| 2008/0215204 A1* | 9/2008 | Roy | G05D 1/0044 | 701/28 |
| 2008/0284647 A1 | 11/2008 | Oren et al. | | |
| 2009/0102711 A1* | 4/2009 | Elwell, Jr. | G01S 5/0273 | 342/357.52 |
| 2009/0119002 A1* | 5/2009 | Krueger | G01S 19/42 | 701/532 |
| 2009/0219976 A1* | 9/2009 | Oren | G01S 19/14 | 375/141 |
| 2009/0316755 A1* | 12/2009 | Collette | G05D 1/0044 | 375/133 |
| 2010/0087980 A1* | 4/2010 | Spura | H04B 7/18504 | 701/24 |
| 2010/0250022 A1* | 9/2010 | Hines | G05D 1/101 | 701/2 |
| 2010/0292871 A1* | 11/2010 | Schultz | G01C 21/00 | 701/3 |
| 2010/0315281 A1* | 12/2010 | Askelson | G01S 7/003 | 342/30 |
| 2011/0035149 A1* | 2/2011 | McAndrew | G05D 1/0038 | 701/466 |
| 2011/0130636 A1* | 6/2011 | Daniel | G08B 25/016 | 600/301 |
| 2011/0169943 A1* | 7/2011 | Bachman, II | G06K 9/209 | 348/117 |
| 2011/0240792 A1 | 10/2011 | Oren et al. | | |
| 2011/0245996 A1* | 10/2011 | Orsulak | G05D 1/0011 | 701/2 |
| 2012/0235863 A1* | 9/2012 | Erdos | H01Q 3/00 | 342/359 |
| 2013/0085981 A1* | 4/2013 | Fuciarelli | G06N 5/02 | 706/52 |

FOREIGN PATENT DOCUMENTS

| | | |
|---|---|---|
| CN | 101963806 | 2/2011 |
| WO | 02086658 | 10/2002 |
| WO | 2008097651 A1 | 8/2008 |

OTHER PUBLICATIONS

"Project on Unmanned Aircraft in the NAS, Final Review Panel Meeting," Carnegie Mellon, May 2007, http://www.andrew.cmu.edu/course/19-451/CMU_UAS_Final_Presentation.ppt.

"UAS in the NAS" Aviation Today, Jun. 2010, http://www.aviationtoday.com/regions/usa/UAS-in-the-NAS_68744.html.

Gerald R. Sayer, "Operation of UAS in the Non-Segregated NAS," 2009/2010 UAS Yearbook—UAS: The Global Perspective—7th Edition—Jun. 2009, http://www.uvs-international.org/uvs-info/Yearbook2009/121-123_Certification-&-Airspace-lntegration_USAF_USA.pdf.

The State Intellectual Property Office of China "First Office Action," issued in connection with application No. 2012100339793 on Dec. 3, 2015, 22 pages (includes English translation).

European Patent Office, "Extended European Search Report," issued in connection with application No. 12157388.5 on Jan. 7, 2013, 5 pages.

European Patent Office, "Communication Pursuant to Article 94(3) EPC," issued in connection with application No. 12157388.5 on Dec. 19, 2013, 4 pages.

European Patent Office, "Invitation Pursuant to Article 94(3) and Rule 71(1) EPC," issued in connection with application No. 12157388.5 on Dec. 31, 2014, 4 pages.

Japanese Patent Office, "Notification of Reasons for Refusal," issued in connection with application No. 2012-035727 on Mar. 2, 2016, 4 pages (includes English translation).

* cited by examiner

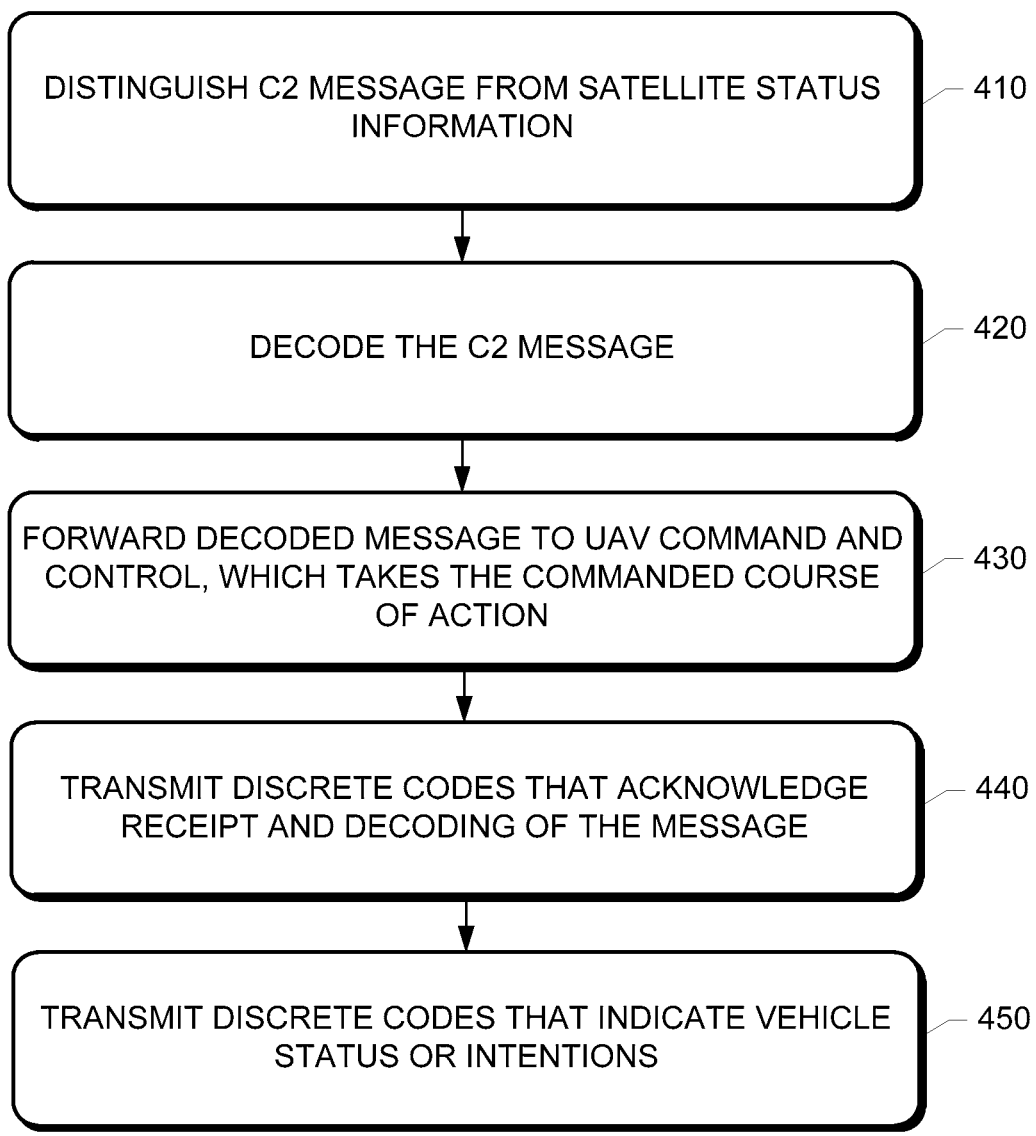

ALTERNATIVE COMMUNICATIONS FOR AN AIR VEHICLE

BACKGROUND

In the past, unmanned air vehicles (UAVs) mainly supported military and security operations. Now, however, these remotely operated vehicles have additional uses, such as border patrol, disaster relief, traffic reporting, aerial photography, and environmental surveys.

With these additional uses, the UAVs share the National Airspace System (NAS) with commercial aircraft and other manned vehicles. UAV flight operations may be granted by the Federal Aviation Administration (FAA).

When manned aircraft are flying in the National Airspace System, they are required to retain the ability communicate with the FAA at all times. If a manned aircraft loses two-way radio communications, its transponder broadcasts squawk code 7600, which notifies air traffic control (ATC) that communications has been lost, and its pilot follows FAA regulations to safely land the aircraft (see, e.g., 14 CFR 91.185).

UAVs do not have these same capabilities as manned vehicles. If the communications system of a UAV fails, the UAV will be unreachable and, consequently, might enter restricted airspace.

The FAA is concerned about the consequences of UAVs that lose radio communications. The ability to re-establish communications with UAVs is needed.

SUMMARY

According to an aspect herein, an air vehicle comprises a satellite receiver having messaging capability. The receiver is configured to process a command and control (C2) message when alternative communications are required. The air vehicle further comprises avionics for taking a course of action according to instructions in a C2 message received by the satellite receiver.

According to another aspect herein, an unmanned air vehicle (UAV) comprises a transponder for transmitting a discrete transponder code indicating that alternative communications are required; a GPS receiver having text messaging capability for receiving satellite status information and also for receiving command and control messages; and UAV Command and Control for instructing the UAV to take a course of action according to a command and control message received by the GPS receiver.

According to another aspect herein, an alternative communications method is used for an air vehicle equipped with a GPS receiver having capability to decode messages. The method comprises receiving a request for alternative communications for the air vehicle, formulating a command and control message that instructs the vehicle to take a course of action, and transmitting the message to the GPS receiver via a GPS satellite.

BRIEF DESCRIPTION OF THE DRAWINGS

FIG. 4 is an illustration of an alternative communications method performed by an air vehicle.

DETAILED DESCRIPTION

Figure 1:
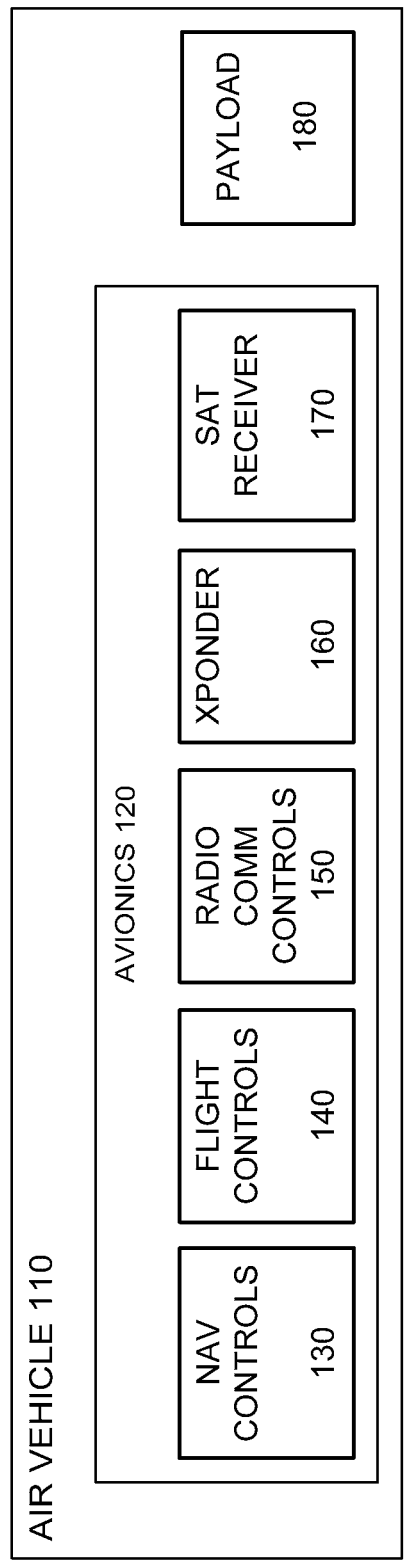
FIG. 1 is an illustration of an air vehicle.

Reference is made to FIG. 1, which illustrates an air vehicle 110. The air vehicle 110 includes an avionics system 120 that performs various functions and includes, but is not limited to, navigation controls 130, flight controls 140, radio communication controls 150, a transponder 160, and a satellite receiver 170 having messaging capability. The functions performed by these components may be implemented in standalone hardware, or several of these functions may be integrated into hardware systems. As a first example, the satellite receiver 170, navigation controls 130 and flight controls 140 may be integrated into a single navigation and flight controls system. As a second example, the radio communication controls 150 and transponder 160 may be integrated into a communications system.

The air vehicle 110 may or may not include a propulsion system. The air vehicle 110 may be a manned vehicle (e.g., a commercial aircraft, a commuter aircraft, or General Aviation aircraft) or an unmanned air vehicle (e.g., an aircraft, or balloon). If the air vehicle 110 is unmanned, the navigation controls 130 and flight controls 140 may be part of an automated navigation and flight controls system.

Figure 2:
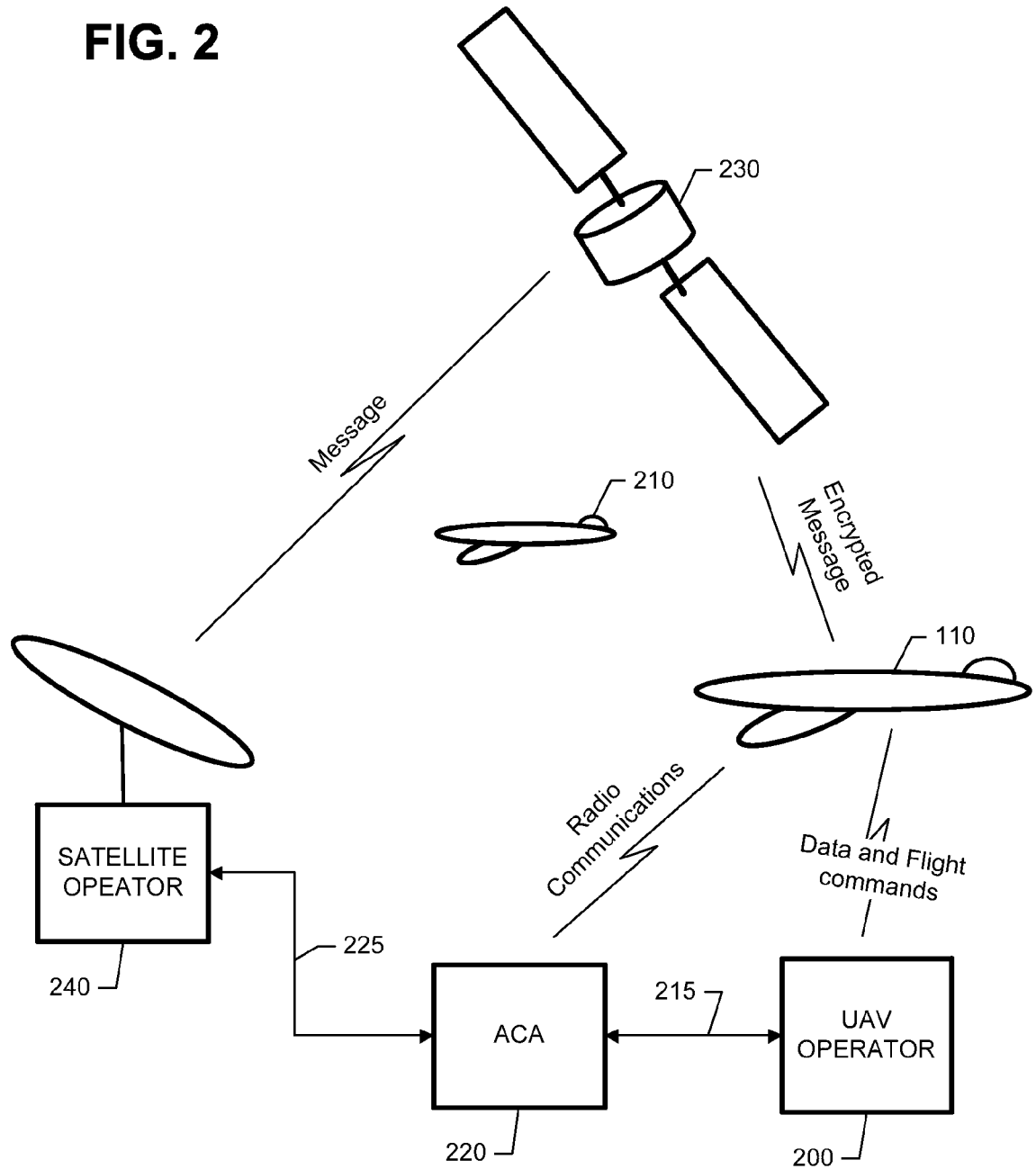
FIG. 2 is an illustration of an unmanned air vehicle in an airspace.

Additional reference is made to FIG. 2, which shows an unmanned air vehicle (UAV) 110 flying in an airspace. The UAV 110 is controlled remotely by a ground or airborne UAV operator 200. The UAV flight controls 140 respond to flight commands from the UAV operator 200, and a payload 180 may send data back to the UAV operator 200.

The flight of the UAV 110 is monitored by an Airspace Control Administrator (ACA). In the United States, for example, the ACA may be a governmental agency such as the FAA, or it may be a non-governmental agency. The UAV radio communication controls 150 maintain two-way radio communications with the ACA 220. The ACA 220 also monitors other air vehicles 210 sharing the airspace.

The UAV satellite receiver 170 communicates with one or more satellites 230. For instance, a Global Positioning System (GPS) receiver 170 receives signals from several GPS satellites 230 to determine the precise position of the UAV 110 in airspace. The GPS receiver 170 also has messaging capability. A text code field allows the GPS receiver 170 to receive and display satellite status information. This is the conventional use of the messaging capability.

The messaging capability of the GPS receiver 170 has another use: the text code field is used to re-establish communications with the ACA 220 in the event alternative communications is required. Alternative communications might be required in the event of two-way radio communications failure between the UAV 110 and the ACA 220 or between the UAV operator 200 and the UAV 110. Such failure might result, for instance, from a primary communications system failure, line-of-sight restrictions, or jamming of a primary communications link.

There are various ways in which the ACA 220 may determine that alternative communications are required. As a first example, the UAV transponder 160 transmits a discrete code (e.g., 7200) signaling that two-way communications has been lost. As a second example, the ACA 220 suddenly loses communications with the UAV 110. As a third example, the UAV operator 200 informs the ACA 220 FAA (e.g., via the link 215) that UAV communications are unavailable.

Figure 3:
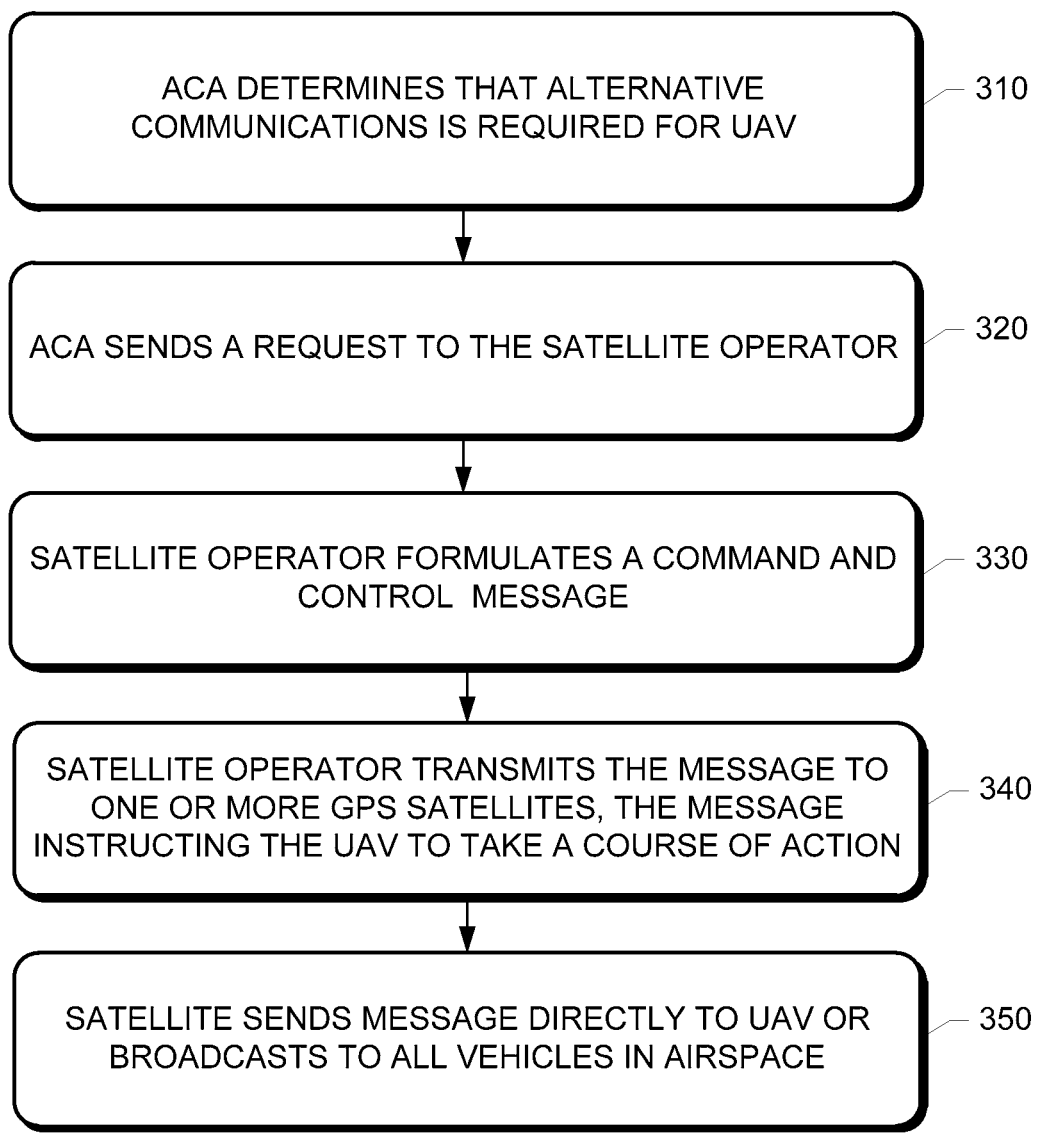
FIG. 3 is an illustration of an alternative communications method performed by an Airspace Control Administrator and a satellite operator.

Additional reference is made to FIG. 3. When the ACA 220 determines that alternative communications are required for the UAV 110 (block 310), it attempts to re-establish communications with the UAV 110 by having a command and control (C2) message sent to the GPS receiver 170, where the C2 message instructs the UAV 110 to take a course of action (blocks 320-350). As a first example, the C2 message specifies a longitude and latitude, and instructs the UAV 110 to fly to that specific location (for instance, where it lands or runs out of fuel). As a second example, the C2 message instructs the UAV 110 to return to its starting location. As a third example, the C2 message instructs the UAV to leave restricted airspace. As a forth example, the C2 message instructs the UAV 110 to self destruct.

The ACA 220 may have the C2 message sent as follows. At block 320, the ACA 220 sends a request to the satellite operator 240 (e.g., via link 225). The request will specify the course of action for the UAV 110.

At block 330, the satellite operator 240 formulates a C2 message. The C2 message might include an identification field and an instructions field. The satellite operator 240 might formulate the C2 message by filling these fields with a code identifying the message as a C2 message and another code corresponding to a specific course of action.

At block 340, the satellite operator 240 transmits the C2 message to one or more satellites 230. At block 350, the satellite 230, in turn, sends the C2 message to the GPS receiver 170 of the UAV 110. The satellite 230 may send the C2 message directly to the UAV 110. In the alternative, the satellite 230 may broadcast the C2 message to all air vehicles 110 and 210 in the airspace. However, the C2 message may be read only by the UAV 110. For instance, the message may be encrypted and may only be decrypted by the air vehicle having a corresponding decryption key and the correct ID.

It may take as little as 0.5 seconds to transmit the C2 message to the GPS satellite 230, receive the C2 message at the GPS receiver 170 onboard the UAV 110, and decode the C2 message. More time may be taken if the C2 message is sent synchronously (e.g., every X seconds) instead of asynchronously (e.g., upon receipt of a request).

Additional reference is made to FIG. 4, which illustrates the response by the UAV 110. At block 410, the satellite receiver 170 distinguishes the C2 message from satellite status information by the type and format of the message that is sent. At block 420, the satellite receiver 170 decodes the C2 message to determine the commanded course of action. For example, the satellite receiver 170 uses a lookup table to look up a code in the appropriate field of the C2 message.

At block 430, the commanded course of action is forwarded to UAV Command and Control, which is the flight control system that performs navigation and control. The UAV Command and Control commands the UAV 110 to take the commanded course of action.

At block 440, the transponder 160 may transmit discrete codes that acknowledge receipt and decoding of the C2 message. For example, code 5601 may be used for such an acknowledgement. The transponder code may be received by the ACA 220.

At block 450, the transponder 160 may also transmit discrete transponder codes indicating vehicle intentions or status. The codes indicating status and intention may be updated periodically. The ACA 220 may override the vehicle intention by having another message sent to the satellite receiver 170.

If the UAV 110 is not broadcasting transponder codes, it may be necessary to determine the location of the UAV 110. Under these circumstances, the UAV 110 may be found via search. One method is to search "skin paint" with ACA active radars.

The avionics 120 of the UAV 110 may be microprocessor-based. Microprocessor-based avionics allow the flight controls 140, transponder 160, and satellite receiver 170 to be implemented via programming. Flight controls, transponders and GPS receivers in general are typically found in all air vehicles. Thus, the alternative communications herein may be implemented without adding extra hardware, thereby saving weight and cost.

Alternative communications herein are not limited to the embodiments above. A satellite receiver 170 other than a GPS receiver may be used to receive messages. As a first example, the satellite receiver 170 may be a Wide Area Augmentation System (WAAS)-capable GPS receiver. WAAS augments GPS by providing greater accuracy and integrity. A WASS receiver uses WAAS customizable data messages. Customizable messages are more flexible than GPS field codes because they enable more distinct commands to be sent (e.g., waypoints, landing sites, and velocity).

The satellite receiver 170 is not limited to positioning systems. The satellite receiver may communicate with a commercial satellite such as XM radio or Sirius radio. Messages may be sent through a service provider for each of these alternative satellite systems.

Alternative communications for manned and unmanned vehicles may be performed in the same basic way. A manned vehicle experiencing a communications failure may receive information from the ACA via its satellite receiver. For instance, the ACA may send a C2 message specifying waypoint information for a new flight path. The satellite receiver decodes the C2 message, and the avionics takes a course of action that includes displaying that information on a cockpit display so the pilot can fly the flight path ordered by the ACA.

The invention claimed is:

1. An unmanned air vehicle comprising:
   a transponder to transmit a transponder code indicative of a communications failure on the unmanned air vehicle;
   a Global Positioning System (GPS) receiver to:
      receive, after the transponder code has been transmitted, a first message and a second message, the first message including satellite status information and the second message including an air vehicle command, the first message sent separately from the second message;
      distinguish the first message from the second message based on formats of the respective messages; and
      decode the second message to determine a course of action based on the air vehicle command; and
   avionics, including a processor, to:
      receive the course of action from the GPS receiver; and
      execute the course of action.

2. The unmanned air vehicle of claim 1, wherein the avionics include a navigation and automated flight control system to automatically execute the course of action upon receipt of the course of action from the GPS receiver.

3. The unmanned air vehicle of claim 2, wherein the navigation and automated flight control system is to instruct the unmanned air vehicle to fly to a location identified in the second message.

4. The unmanned air vehicle of claim 1, wherein the transponder code indicates a communication failure between the unmanned air vehicle and at least one of an airspace control administrator or an unmanned air vehicle operator.

5. The unmanned air vehicle of claim 4, wherein the transponder code indicates a two-way radio failure.

6. The unmanned air vehicle of claim 1, wherein the transponder is to transmit a transponder code acknowledging receipt and decoding of the second message.

7. The unmanned air vehicle of claim 1, wherein the transponder code is a first transponder code and the transponder is to further transmit a second transponder code indicating at least one of a status of the unmanned air vehicle or the course of action.

8. The unmanned air vehicle of claim 1, wherein the GPS receiver is a Wide Area Augmentation System-capable GPS receiver, and wherein the air vehicle command of the second message is customizable.

9. The air vehicle of claim 1, wherein the GPS receiver is to determine that the second message is intended for the unmanned air vehicle based on a decryption key.

10. An unmanned air vehicle comprising:
a communications link to establish communications between the unmanned air vehicle and at least one of an airspace control administrator or an unmanned air vehicle operator;
a transponder to transmit a first transponder code indicating a communications failure with the communications link; and
a Global Positioning Receiver (GPS) receiver to receive, after the code has been transmitted, a command and control message to re-establish communication between the air vehicle and the at least one of the airspace control administrator or the unmanned air vehicle operator; and a processor to instruct the unmanned air vehicle to execute a course of action based on the command and control message received by the GPS receiver.

11. The unmanned air vehicle of claim 10, wherein the transponder is to transmit a second transponder code acknowledging receipt of the command and control message.

12. The air vehicle of claim 10, wherein the transponder is to transmit a second transponder code indicative of at least one of a status of the unmanned air vehicle or a course of action of the unmanned air vehicle, the course of action based on the command and control message.

13. The unmanned air vehicle of claim 12, wherein the GPS receiver is to determine that the command and control message is intended for the unmanned air vehicle based on a decryption key.

14. An method for re-establishing communications between an unmanned air vehicle and an airspace administrator or an unmanned air vehicle operator, the method comprising:
receiving a transponder code from the unmanned air vehicle indicating a communications failure on the unmanned air vehicle;
formulating a command and control message that instructs the unmanned air vehicle to take a course of action; and
transmitting the command and control message to a Global Positioning Receiver (GPS) receiver of the unmanned air vehicle via a GPS satellite to re-establish communications with the unmanned air vehicle; and
executing, via a processor, the course of action based on the command and control message transmitted to the GPS receiver.

15. The method of claim 14, wherein the command and control message includes a location to which the unmanned air vehicle is to travel.

16. The method of claim 14, wherein the transmitting of the command and control message is in response to a two-way radio communications failure.

17. The method of claim 14, further including encrypting the command and control message for receipt by the unmanned air vehicle.

18. The unmanned air vehicle of claim 1, wherein the GPS receiver is to forward the course of action to the avionics to re-establish command and control communications with the air vehicle in response to a communications failure at the air vehicle.

19. The unmanned air vehicle of claim 9, wherein the unmanned air vehicle is a first unmanned air vehicle and wherein the GPS receiver is to distinguish the second message for the first unmanned air vehicle from a third message for a second unmanned air vehicle based on the decryption key, the second message and the third message broadcast to the first unmanned air vehicle and the second unmanned air vehicle.

20. The unmanned air vehicle of claim 1, wherein the transponder code is a first transponder code and the transponder is to transmit a second transponder code indicative of an intended course of action, the second message to override the intended course of action.

* * * * *

UNITED STATES PATENT AND TRADEMARK OFFICE
CERTIFICATE OF CORRECTION

| | | |
|---|---|---|
| PATENT NO. | : 9,766,337 B2 | |
| APPLICATION NO. | : 13/037297 | |
| DATED | : September 19, 2017 | |
| INVENTOR(S) | : Charles B. Spinelli | |

It is certified that error appears in the above-identified patent and that said Letters Patent is hereby corrected as shown below:

In the Claims

Column 5, Line 25 (Claim 10): Replace the words "Global Positioning Receiver" with "Global Positioning System"

Column 6, Line 12 (Claim 14): Replace the words "Global Positioning Receiver" with "Global Positioning System"

Signed and Sealed this
Seventh Day of November, 2017

Joseph Matal
*Performing the Functions and Duties of the
Under Secretary of Commerce for Intellectual Property and
Director of the United States Patent and Trademark Office*